US 011194427B2

(12) United States Patent
Gwon et al.

(10) Patent No.: US 11,194,427 B2
(45) Date of Patent: Dec. 7, 2021

(54) DISPLAY DEVICE HAVING TOUCH SENSOR AND A SHIELD LINE

(71) Applicant: LG DISPLAY CO., LTD., Seoul (KR)

(72) Inventors: Hyang-Myoung Gwon, Paju-si (KR); Ji-Hyun Jung, Paju-si (KR); Ru-Da Rhe, Seoul (KR); Jae-Gyun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/515,835

(22) Filed: Jul. 18, 2019

(65) Prior Publication Data

US 2020/0026377 A1    Jan. 23, 2020

(30) Foreign Application Priority Data

Jul. 19, 2018 (KR) .................. 10-2018-0084291

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC .............. G06F 3/044; G06F 3/0412; G06F 2203/04111; G06F 2203/04102; G06F 2203/04112; G06F 2203/04107; G06F 3/0446; G06F 3/04182; G06F 3/0443; G06F 3/0416

See application file for complete search history.

(56) References Cited

U.S. PATENT DOCUMENTS

| | | | |
|---|---|---|---|
| 2013/0016065 A1* | 1/2013 | Reynolds | G06F 3/047 345/174 |
| 2013/0155007 A1* | 6/2013 | Huang | G06F 3/0416 345/174 |
| 2015/0145802 A1* | 5/2015 | Yao | G06F 3/0416 345/174 |
| 2015/0145808 A1* | 5/2015 | Cho | G06F 3/044 345/174 |
| 2016/0378224 A1* | 12/2016 | Kwon | H01L 27/322 345/174 |
| 2017/0199611 A1* | 7/2017 | Brunet | G06F 3/044 |
| 2018/0129352 A1* | 5/2018 | Kim | G06F 3/0412 |
| 2018/0166507 A1* | 6/2018 | Hwang | G06F 3/041 |

(Continued)

FOREIGN PATENT DOCUMENTS

EP    3 506 066 A    7/2019

*Primary Examiner* — Temesghen Ghebretinsae
*Assistant Examiner* — Ivelisse Martinez Quiles
(74) *Attorney, Agent, or Firm* — Birch, Stewart, Kolasch & Birch, LLP

(57) ABSTRACT

The present disclosure provides a display device having a touch sensor for securing improved touch-sensing performance. The display device having a touch sensor includes a touch-driving circuit configured to drive a touch-driving line and a touch-sensing line, which are disposed on an encapsulation unit covering a light-emitting element, in a mutual-capacitance mode and to drive at least one of the touch-driving line or the touch-sensing line in a self-capacitance mode, and the touch-driving circuit supplies a load free driving signal to a shield line overlapping the touch-driving line and the touch-sensing line, thereby securing improved touch-sensing performance.

11 Claims, 10 Drawing Sheets

(56) References Cited

U.S. PATENT DOCUMENTS

| | | | |
|---|---|---|---|
| 2018/0175116 A1* | 6/2018 | Song | G06F 3/0412 |
| 2018/0182821 A1* | 6/2018 | Yun | G06F 3/0412 |
| 2019/0095007 A1* | 3/2019 | Jeong | G06F 1/1643 |
| 2019/0102010 A1* | 4/2019 | Knabenshue | G06F 3/044 |
| 2019/0204952 A1* | 7/2019 | Han | H01L 27/3246 |
| 2019/0302959 A1* | 10/2019 | Clark | G06F 3/0412 |

\* cited by examiner

DISPLAY DEVICE HAVING TOUCH SENSOR AND A SHIELD LINE

CROSS-REFERENCE TO RELATED APPLICATION

This application claims the priority benefit of Korean Patent Application No. 10-2018-0084291, filed in the Republic of Korea on Jul. 19, 2018, the disclosure of which is hereby incorporated by reference as if fully set forth herein.

BACKGROUND OF THE INVENTION

Field of the Invention

The present invention relates to a display device, and more particularly to a display device having a touch sensor for securing improved touch-sensing performance.

Discussion of the Related Art

A touch sensor is an input device through which a user can input a command by selecting instructions displayed on a screen of a display device using a hand or an object. That is, the touch sensor converts a contact position that directly contacts a human hand or an object into an electrical signal and receives selected instructions based on the contact position as an input signal. Such a touch sensor can substitute for a separate input device that is connected to a display device and operated, such as a keyboard or a mouse, and thus the range of application of the touch sensor has continually increased.

In the case in which a touch sensor is disposed on a display device, parasitic capacitance is formed at a region at which the conductive layers of the display device and the touch sensor overlap each other. This parasitic capacitance increases a touch-driving load and deteriorates touch-sensing accuracy. In particular, the shorter the distance between the conductive layer of the display device and the touch sensor, the larger the parasitic capacitance, which makes it difficult to ensure touch-sensing performance.

SUMMARY OF THE INVENTION

The present invention is directed to a display device having a touch sensor that substantially obviates one or more problems due to limitations and disadvantages of the related art.

An object of the present invention is to provide a display device having a touch sensor for securing improved touch-sensing performance.

Additional advantages, objects, and features of the invention will be set forth in part in the description which follows and in part will become apparent to those having ordinary skill in the art upon examination of the following or can be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, a display device having a touch sensor includes a touch-driving circuit configured to drive a touch-driving line and a touch-sensing line, which are disposed on an encapsulation unit covering a light-emitting element, in a mutual-capacitance mode and to drive at least one of the touch-driving line or the touch-sensing line overlapping a shield line in a self-capacitance mode, and the touch-driving circuit supplies a load free driving signal to the shield line, thereby securing improved touch-sensing performance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to exemplary embodiments of the present invention, examples of which are illustrated in the accompanying drawings. Wherever possible, the same reference numbers will be used throughout the drawings to refer to the same or like parts.

Figure 1:
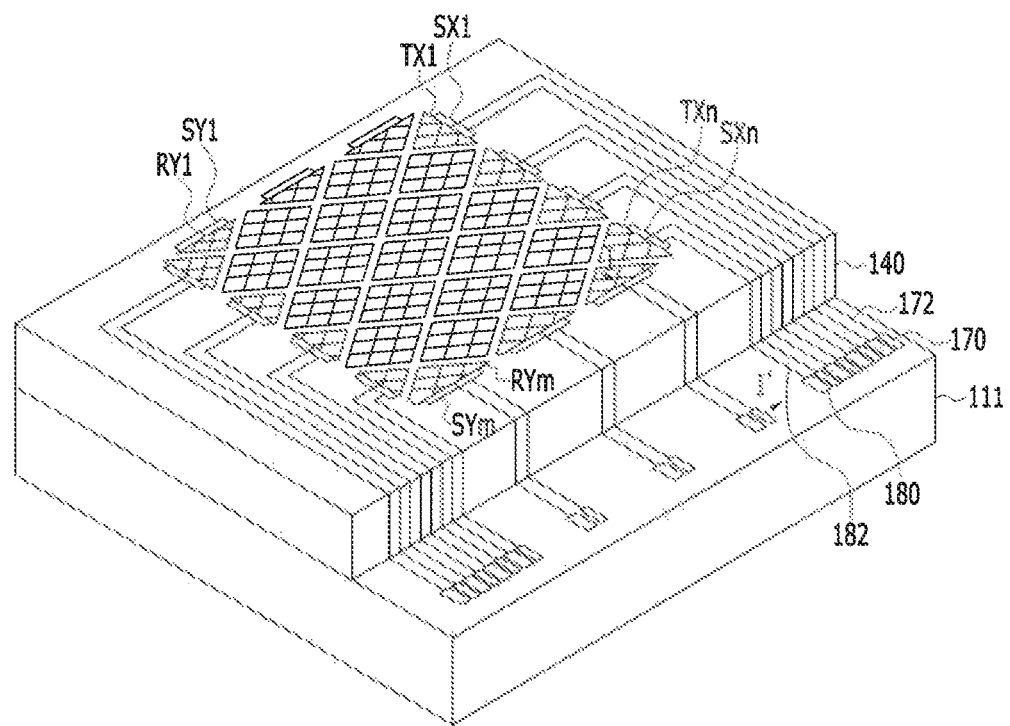
FIG. 1 is a perspective view illustrating a display panel having a touch sensor according to an example of the present invention.

FIG. 1 is a perspective view illustrating an organic light-emitting display device having a touch sensor according to an example of the present invention. All the components of the organic light-emitting display device according to all embodiments of the present invention are operatively coupled and configured.

The organic light-emitting display device having the touch sensor illustrated in FIG. 1 includes a plurality of subpixels arranged in a matrix form on the substrate 111, an encapsulation unit 140 disposed on the subpixels, touch sensors TX and RY disposed on the encapsulation unit 140, and shield electrodes SX and SY disposed between the encapsulation unit 140 and the touch sensors TX and RY.

The organic light-emitting display device having the touch sensor has an active area disposed on a substrate 111 and a non-active area disposed adjacent to the active area. The substrate 111 is formed of a flexible material such as plastic or glass to be foldable or bendable. For example, the substrate 111 is formed of polyimide (PI), polyethylene terephthalate (PET), polyethylene naphthalate (PEN), polycarbonate (PC), polyethersulfone (PES), polyacrylate (PAR), polysulfone (PSF), or cyclic-olefin copolymer (COC).

The active area displays an image through unit pixels arranged in a matrix form. Each unit pixel includes red, green and blue subpixels, or includes red, green, blue, and white subpixels.

Figure 2:
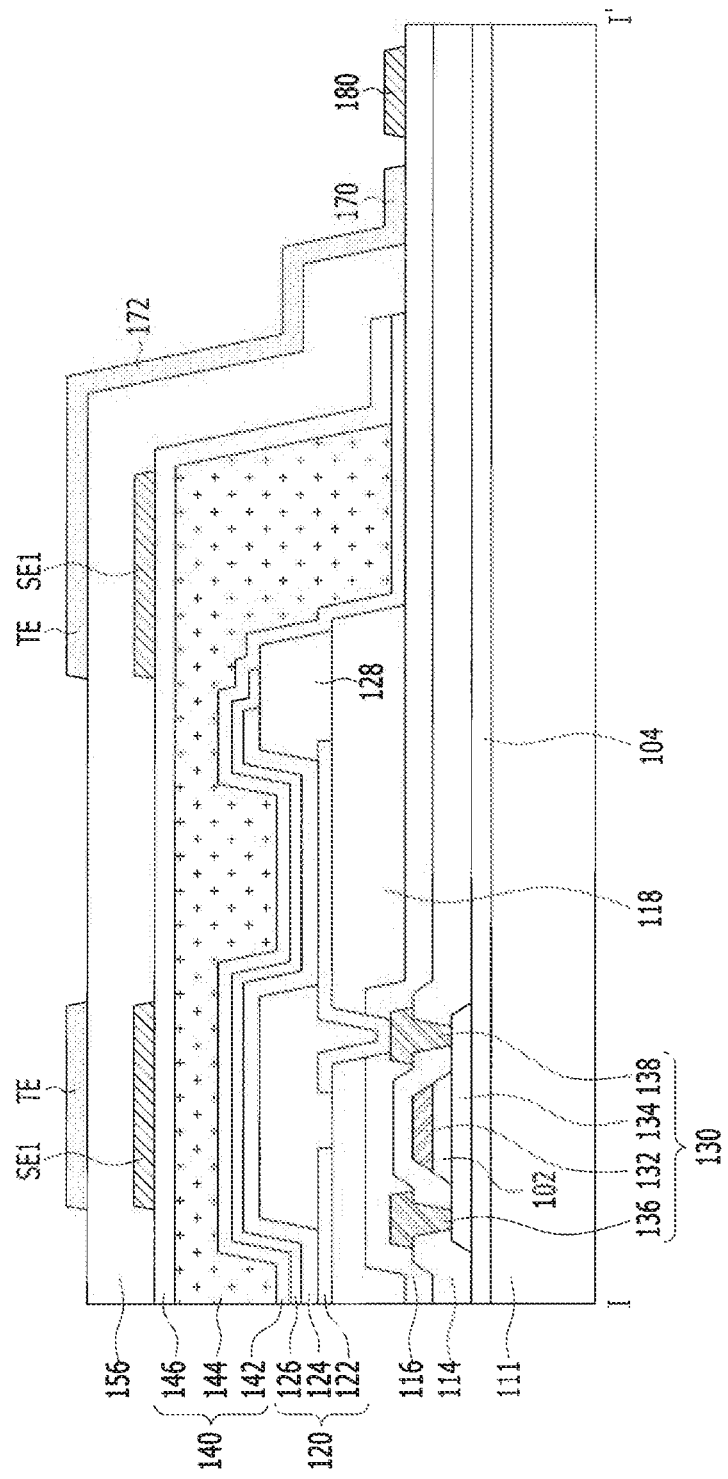
FIG. 2 is a cross-sectional view taken along line I-I' in the display panel having a touch sensor illustrated in FIG. 1.

Each of the subpixels includes, as illustrated in FIG. 2, a pixel-driving circuit, including a plurality of thin-film transistors 130, and a light-emitting element 120 connected to the pixel-driving circuit.

Each of the driving thin-film transistors 130 included in the pixel-driving circuit controls the current supplied from a high-voltage supply line to the light-emitting element 120 in response to a data signal supplied to a gate electrode of the corresponding driving thin-film transistor 130, thus adjusting the amount of light emitted from the light-emitting element 120.

Such a driving thin-film transistor 130, as illustrated in FIG. 2, includes a semiconductor layer 134 disposed on a buffer layer 104, a gate electrode 132 overlapping the semiconductor layer 134 with a gate insulation film 102 interposed therebetween, and source and drain electrodes 136 and 138 formed on an interlayer insulation film 114 so as to come into contact with the semiconductor layer 134. Here, the semiconductor layer 134 is formed of at least one of an amorphous semiconductor material, a polycrystalline semiconductor material, or an oxide semiconductor material.

The light-emitting element 120 includes an anode 122, at least one light-emitting stack 124 formed on the anode 122, and a cathode 126 formed on the light-emitting stack 124.

The anode 122 is electrically connected to the drain electrode 138 of the driving thin-film transistor 130, which is exposed through a pixel contact hole penetrating a protective film 116 and a pixel planarization layer 118.

The light-emitting stack 124 is formed on the anode 122 in a light-emitting area that is defined by the bank 128. The light-emitting stack 124 is formed by stacking a hole-related layer, an organic emission layer, and an electron-related layer on the anode 122 in that order or in the reverse order. In addition, the light-emitting stack 124 can include first and second light-emitting stacks, which face each other with a charge generation layer interposed therebetween. In this case, the organic emission layer of any one of the first and second light-emitting stacks generates blue light, and the organic emission layer of the other one of the first and second light-emitting stacks generates yellow-green light, whereby white light is generated via the first and second light-emitting stacks. Since the white light generated in the light-emitting stack 124 is incident on a color filter located above or under the light-emitting stack 124, a color image can be realized.

In addition, colored light corresponding to each subpixel can be generated in each light-emitting stack 124 in order to realize a color image without a separate color filter. That is, the light-emitting stack 124 of the red subpixel can generate red light, the light-emitting stack 124 of the green subpixel can generate green light, and the light-emitting stack 124 of the blue subpixel can generate blue light.

The cathode 126 is formed so as to face the anode 122 with the light-emitting stack 124 interposed therebetween and is connected to a low-voltage supply line.

The encapsulation unit 140 can prevent external moisture or oxygen from permeating the light-emitting element 120, which is vulnerable to external moisture or oxygen. To this end, the encapsulation unit 140 includes at least one inorganic encapsulation layer 142 and at least one organic encapsulation layer 144. In the example(s) of the present invention, the structure of the encapsulation unit 140 in which the first inorganic encapsulation layer 142, the organic encapsulation layer 144 and the second inorganic encapsulation layer 146 are stacked in that order will be described by way of example.

The first inorganic encapsulation layer 142 is formed on the substrate 111, on which the cathode 126 has been formed. The second inorganic encapsulation layer 146 is formed on the substrate 111, on which the organic encapsulation layer 144 has been formed, so as to cover the upper surface, the lower surface and the side surface of the organic encapsulation layer 144 together with the first inorganic encapsulation layer 142.

The first and second inorganic encapsulation layers 142 and 146 minimize or prevent the permeation of external moisture or oxygen into the light-emitting stack 124. Each of the first and second inorganic encapsulation layers 142 and 146 is formed of an inorganic insulation material that is capable of being deposited at a low temperature, such as silicon nitride (SiNx), silicon oxide (SiOx), silicon oxide nitride (SiON), or aluminum oxide ($Al_2O_3$). Thus, since the first and second inorganic encapsulation layers 142 and 146 are deposited in a low-temperature atmosphere, it is possible to prevent damage to the light-emitting stack 124, which is vulnerable to a high-temperature atmosphere, during the process of depositing the first and second inorganic encapsulation layers 142 and 146.

The organic encapsulation layer 144 serves to dampen the stress between the respective layers due to bending of the organic light-emitting display device and to increase planarization performance. The organic encapsulation layer 144 is formed on the substrate 111, on which the first inorganic encapsulation layer 142 has been formed, using a non-photosensitive organic insulation material, such as PCL, acrylic resin, epoxy resin, polyimide, polyethylene or silicon oxycarbide (SiOC), or using a photosensitive organic insulation material such as photoacryl. The organic encapsulation layer 144 is disposed in the active area, rather than the non-active area.

As illustrated in FIGS. 1 and 2, a touch pad 170 and a shield pad 180 are disposed in the pad area of the substrate 111 that is exposed by the encapsulation unit 140. The pad area, in which the touch pad 170 and the shield pad 180 are disposed, can be bent and disposed on the rear surface of the active area. Thus, the area occupied by the active area is maximized and the area corresponding to the pad area is minimized on the entire screen of the display device.

The touch pad 170 and the shield pad 180 are disposed on the portion of the substrate 111 that is exposed by the encapsulation unit 140. That is, the touch pad 170 and the shield pad 180 are disposed in the same plane as a display pad, which is connected to at least one of a scan line or a data line of the pixel-driving circuit. For example, each of the touch pad 170, the shield pad 180 and the display pad is disposed on a display insulation film of at least one of the buffer layer 104, the interlayer insulation film 114, the protective film 116 or the planarization film 118, which is disposed between the substrate 111 and the encapsulation unit 140, or on a touch insulation film 156.

The touch pad 170 is connected to each of the touch-sensing line RY and the touch-driving line TX via a touch-routing line 172, and the shield pad 180 is connected to each of a shield-sensing line SY and a shield-driving line SX via a shield-routing line 182.

The shield-routing line 182 and the touch-routing line 172 are disposed along the side surface of the second inorganic encapsulation layer 146, which is the uppermost layer of the encapsulation unit 140. Thus, even when external oxygen or moisture permeates through the touch-routing line 172, the oxygen or moisture is blocked by the organic encapsulation layer 144 and the first and second inorganic encapsulation layers 142 and 146, thereby protecting the light-emitting stack 124 from the oxygen or moisture.

The touch-driving line Tx and the touch-sensing line RY, which are connected to the touch-routing line 172, are disposed above the active region of the encapsulation unit 140.

The touch-driving line TX and the touch-sensing line RY form a mutual capacitance sensor Cm and a self-capacitance sensor Cs. The mutual capacitance sensor Cm, which is formed at the intersection between the touch-driving line Tx and the touch-sensing line RY, charges an electric charge in response to a first touch-driving signal to be supplied to the touch-driving line TX, and senses a touch coordinate by discharging the electric charge to the touch-sensing line RY. The self-capacitance sensor Cs, which is formed at any one of the touch-driving line TX and the touch-sensing line RY, charges an electric charge in response to a second touch-driving signal supplied to any one of the touch-driving line TX and the touch-sensing line RY, and senses a touch coordinate by discharging the electric charge through any one of the touch-driving line TX and the touch-sensing line RY.

Figure 3:
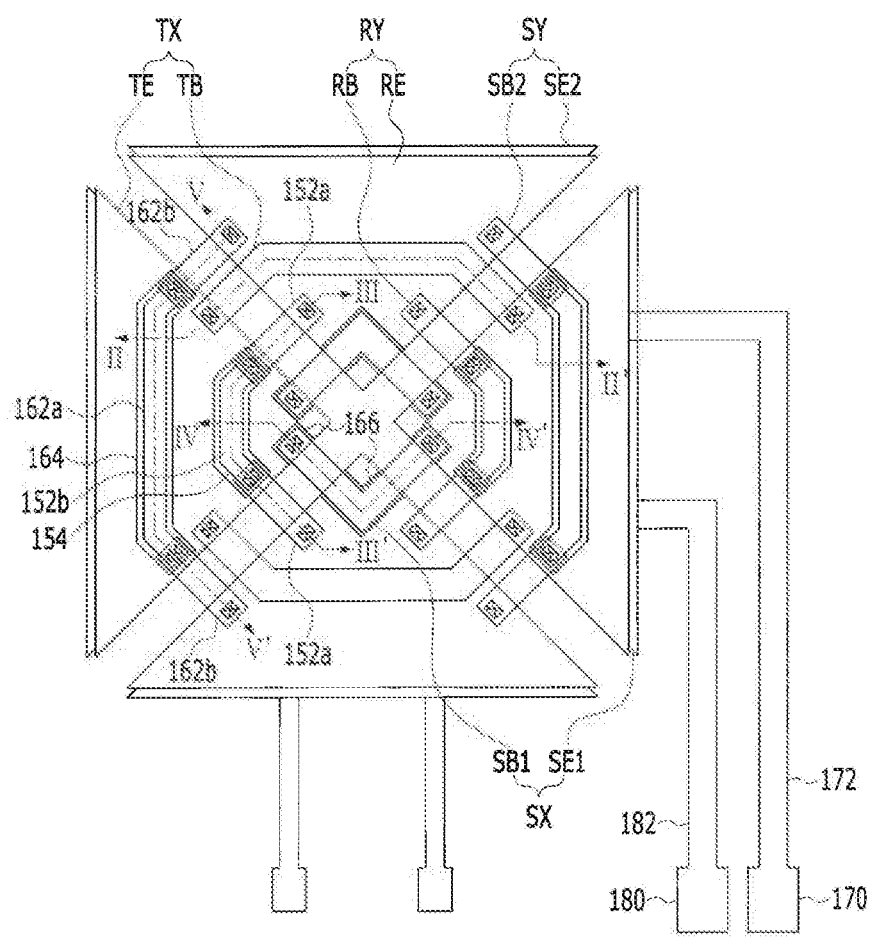
FIG. 3 is a plan view illustrating the touch sensor illustrated in FIG. 1 in detail.
Figure 4A:
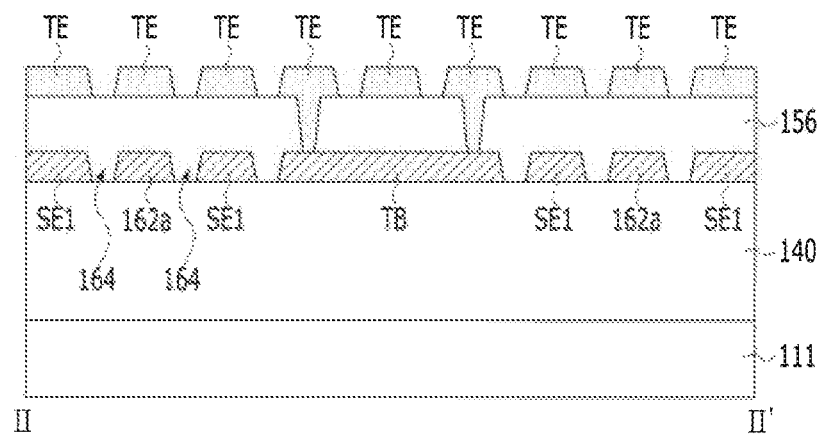
FIG. 4A is a cross-sectional view taken along line II-II' in the display device having a touch sensor illustrated in FIG. 3.

As illustrated in FIGS. 3 and 4A, the touch-driving line TX includes a plurality of touch-driving electrodes TE and first touch bridges TB electrically connecting the touch-driving electrodes TE to each other.

The touch-driving electrodes TE are spaced apart from each other at regular intervals in the X-axis direction, which is the first direction, on the touch insulation film 156. Each of the touch-driving electrodes TE is electrically connected to an adjacent touch-driving electrode TE via the first touch bridge TB.

The first touch bridge TB is disposed on the second inorganic encapsulation layer 146 of the encapsulation unit 140, and is exposed through a contact hole penetrating the touch insulation film 156 and is electrically connected to the touch-driving electrodes TE.

Figure 4B:
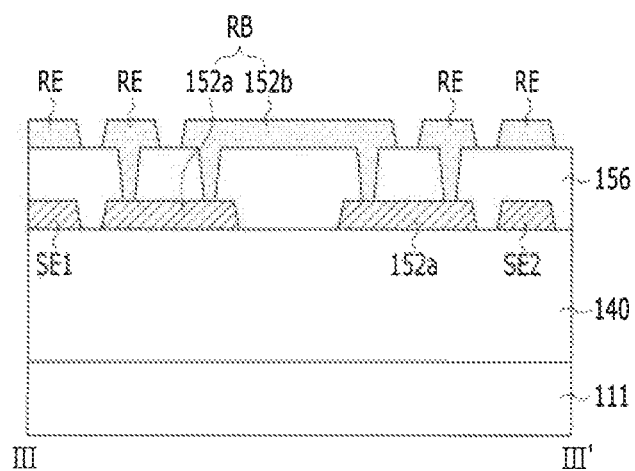
FIG. 4B is a cross-sectional view taken along line III-III' in the display device having a touch sensor illustrated in FIG. 3.

As illustrated in FIGS. 3 and 4B, the touch-sensing line RY includes a plurality of touch-sensing electrodes RE and second touch bridges RB electrically connecting the touch-sensing electrodes RE to each other.

The touch-sensing electrodes RE are spaced apart from each other at regular intervals in the Y-axis direction, which is the second direction, on the touch insulation film 156 in the same plane as the touch-driving electrodes TE. Each of the touch-sensing electrodes RE is electrically connected to an adjacent touch-sensing electrode RE via the second touch bridge RB.

The second touch bridge RB includes lower and upper touch bridges 152*a* and 152*b*, which are disposed in different planes from each other.

The lower touch bridge 152*a* is disposed on the second inorganic encapsulation layer 146 of the encapsulation unit in the same plane as the shield-driving electrodes SE1 and shield-sensing electrodes SE2. The lower touch bridge 152*a* is exposed through a contact hole penetrating the touch insulation film 156 and is connected to the touch-sensing electrode RE.

The upper touch bridge 152*b* is disposed on the touch insulation film 156 in the same plane as the touch-driving electrode TE so as to cross the touch-driving electrode TE. The upper touch bridge 152*b* is disposed so as to be spaced apart from the touch-driving electrode TE with a separation hole 154 therebetween, thereby preventing the occurrence of a short-circuit between the touch-driving electrode TE and the upper touch bridge 152*b*. The upper touch bridge 152*b* is electrically connected to the lower touch bridge 152*a*, which is exposed through a contact hole penetrating the touch insulation film 156.

A shield line, which includes the shield-driving line SX and the shield-sensing line SY, is disposed between each of the touch-driving line TX and the touch-sensing line RY and the light-emitting element 120. The shield-driving line SX is disposed along the touch-driving line TX, the touch-driving line TX is disposed to overlap the shield-driving line SX, the shield-sensing line SY is disposed along the touch-sensing line RY, and the touch-sensing line RY is disposed to overlap the shield-sensing line SY. The touch insulation film 156 is disposed between the touch-driving line TX and the shield-driving line SX and between the touch-sensing line RY and the shield-sensing line SY.

Figure 4C:
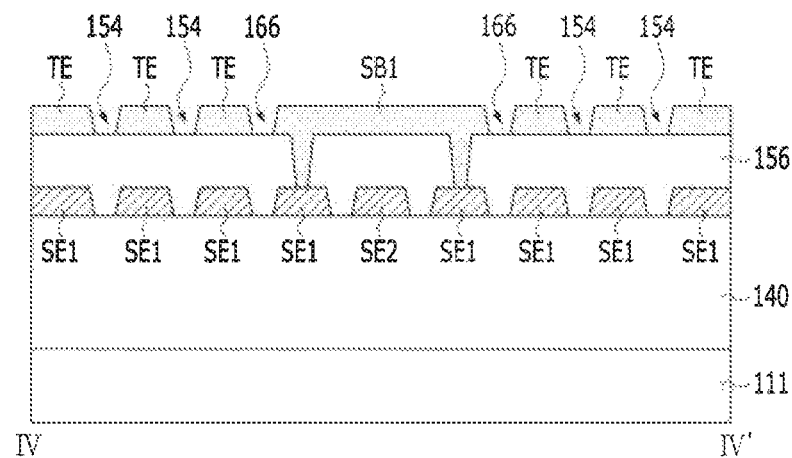
FIG. 4C is a cross-sectional view taken along line IV-IV' in the display device having a touch sensor illustrated in FIG. 3.

As illustrated in FIGS. 3 and 4C, the shield-driving line SX includes a plurality of shield-driving electrodes SE1 and first shield bridges SB1 electrically connecting the shield-driving electrodes SE1 to each other.

The shield-driving electrodes SE1 are spaced apart from each other at regular intervals in the X-axis direction, which is the first direction, on the touch insulation film 156. Each of the shield-driving electrodes SE1 is electrically connected to an adjacent shield-driving electrode SE1 via the first shield bridge SB1.

The first shield bridge SB1 is disposed on the touch insulation film 156 in the same plane as the touch-sensing electrode RE so as to cross the touch-sensing electrode SE. The first shield bridge SB1 is disposed so as to be spaced apart from the touch-sensing electrode RE with a separation hole 166 therebetween, thereby preventing the occurrence of a short-circuit between the touch-sensing electrode RE and the first shield bridge SB1. The first shield bridge SB1 is electrically connected to the shield-driving electrodes SE1, which are exposed through a contact hole penetrating the touch insulation film 156.

Figure 4D:
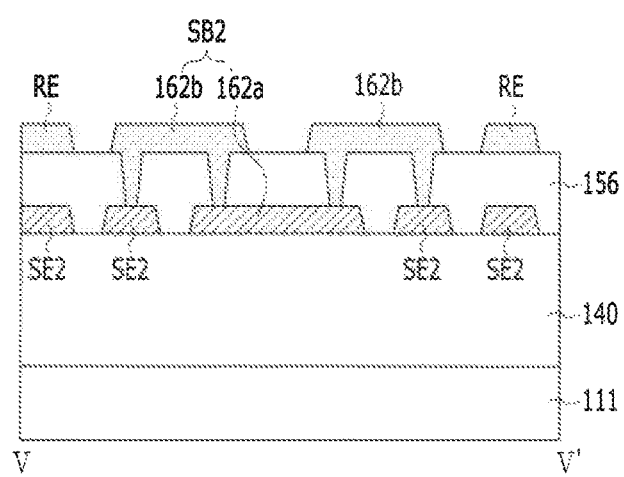
FIG. 4D is a cross-sectional view taken along line V-V' in the display device having a touch sensor illustrated in FIG. 3.

As illustrated in FIGS. 3 and 4D, the shield-sensing line SY includes a plurality of shield-sensing electrodes SE2 and second sensing bridges SB2 electrically connecting the shield-sensing electrodes SE2 to each other.

The shield-sensing electrodes SE2 are spaced apart from each other at regular intervals in the Y-axis direction, which is the second direction, on the second inorganic encapsulation layer 146 in the same plane as the shield-driving electrodes SE1. Each of the shield-sensing electrodes SE2 is electrically connected to an adjacent shield-sensing electrode SE2 via the second shield bridge SB2.

The second shield bridge SB2 includes lower and upper shield bridges 162a and 162b, which are disposed in different planes from each other.

The lower shield bridge 162a is disposed on the second inorganic encapsulation layer in the same plane as the shield-driving and shield-sensing electrodes SE1 and SE2 so as to cross the shield-sensing electrode SE1. As illustrated in FIG. 4A, the lower shield bridge 162a is disposed so as to be spaced apart from the shield-sensing electrode SE1 with a separation hole 164 therebetween, thereby preventing the occurrence of a short-circuit between the shield-sensing electrode SE1 and the lower shield bridge 162a. The lower shield bridge 162a is electrically connected to the upper shield bridge 162b that is exposed through the contact hole penetrating the touch insulation film 156, as illustrated in FIG. 4D.

The upper shield bridge 162b is disposed on the touch insulation film 156 in the same plane as the touch-sensing electrode RE.

At least one of the touch-driving electrodes TE, the touch-sensing electrodes RE, the shield-driving electrodes SE1 or the shield-sensing electrodes SE2, which are illustrated in FIGS. 3 to 4D, is formed in a mesh shape. Each of the mesh-shaped electrodes TE, RE, SE1 and SE2 corresponds to the bank 128 of each subpixel, and the open area between the meshes of each of the electrodes TE, RE, SE1 and SE2 corresponds to the emission area of each subpixel.

At least one of the first touch bridge TB, the second touch bridge RB, the first shield bridge SB1 or the second shield bridge SB2, illustrated in FIGS. 3 to 4D, is disposed so as to overlap the bank 128, thereby preventing the aperture ratio from being lowered by the bridges TB, RB, SB1 and SB2.

When driven in a self-capacitance mode, a load free driving signal (LFD) is supplied to at least one of the shield-driving line SX or the shield-sensing line SY. The load free driving signal is an alternating-current signal of a voltage of which at least one of the amplitude or the phase is the same as that of the touch-driving signal to be supplied to at least one of the touch-driving line TX or the touch-sensing line RY. Thus, because there is no difference in voltage between the shield lines SX and SY and the touch lines TX and RY, it is possible to minimize parasitic capacitance between the shield lines SX and SY and the touch lines TX and RY.

When driven in a mutual-capacitance mode, the shield-driving line SX is electrically connected to the touch-driving line TX, or is switched to a floating state in which no signal is applied thereto. In addition, when driven in the mutual-capacitance mode, the shield-sensing line SY is electrically connected to the touch-sensing line RY, or is switched to a floating state in which no signal is applied thereto. In particular, during the mutual-capacitance sensing operation, when the shield-driving line SX and the touch-driving line TX are electrically connected to each other and the shield-sensing line SY and the touch-driving line RY are electrically connected to each other, the line resistance of each of the touch-driving line TX and the touch-sensing line RY can be reduced.

Figure 5:
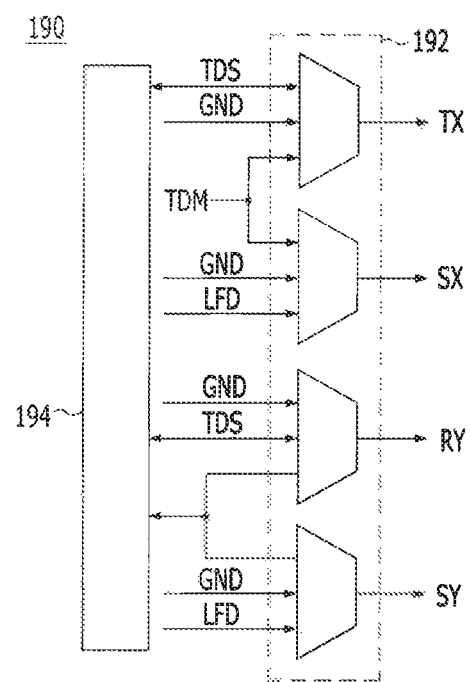
FIG. 5 is a view illustrating a touch-driving circuit for driving the touch sensor according to an example of the present invention.

FIG. 5 is a view illustrating the touch-driving circuit for driving the touch sensors according to an example of the present invention.

The touch-driving circuit 190 illustrated in FIG. 5 determines the presence or absence of a touch and a touch position by controlling the operation of the touch sensors in the mutual-capacitance mode and the self-capacitance mode. The touch-driving circuit 190 includes a multiplexer 192 and a sensing unit 194.

In the mutual-capacitance mode, the multiplexer 192 electrically connects a driving power source, for generating a first touch-driving signal TDM, the touch-driving line TX, and the shield-driving line SX to each other, and connects the touch-sensing line RY and the shield-sensing line SY to the sensing unit 194.

In the first self-capacitance mode, the multiplexer 192 connects the touch-driving line TX to a driving power source for generating a second touch-driving signal TDS and connects the touch-driving line TX to the sensing unit 194. In the first self-capacitance mode, the multiplexer 192 connects the shield-driving electrode SX to a driving power source for generating the load free driving signal LFD corresponding to the second touch-driving signal TDS.

In the second self-capacitance mode, the multiplexer 192 connects the touch-sensing line RY to the driving power source for generating the second touch-driving signal TDS and connects the touch-sensing line RY to the sensing unit 194. In the second self-capacitance mode, the multiplexer 192 connects the shield-sensing electrode SY to the driving power source for generating the load free driving signal LFD corresponding to the second touch-driving signal TDS.

The sensing unit 194 is connected to the touch-sensing lines RY1 to RYm, the touch-driving lines TX1 to TXn, the shield-sensing lines SY1 to SYm and the shield-driving lines SX1 to SXn via the multiplexer 192, and senses variation in potential of the touch-sensing lines RY1 to RYm, the touch-driving lines TX1 to TXn, the shield-sensing lines SY1 to SYm and the shield-driving lines SX1 to SXn.

Figure 6A:
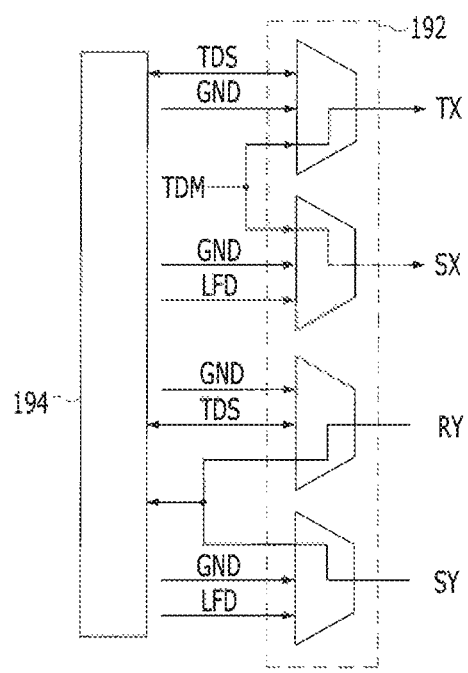
FIGS. 6A to 6C are views illustrating a mutual-capacitance mode and a self-capacitance mode according to an example of the present invention in detail.
Figure 6B:
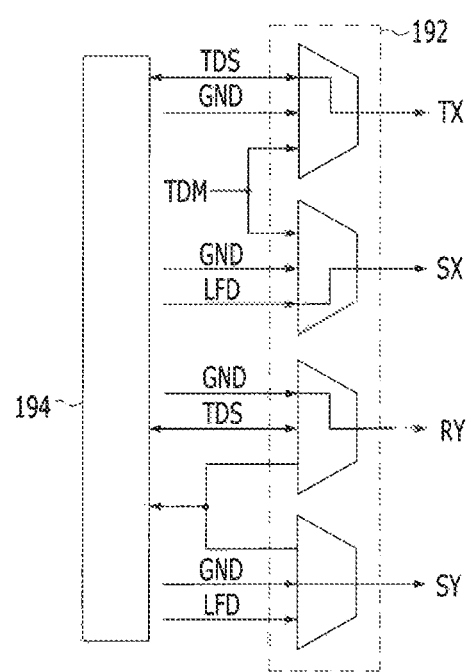
Figure 6C:
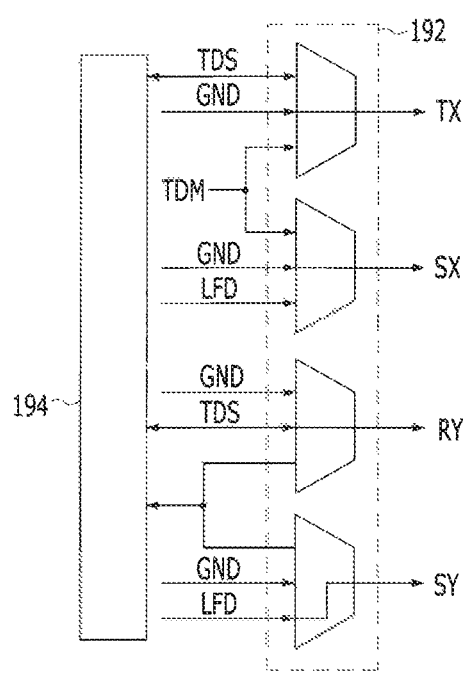

FIG. 6A is a view illustrating the mutual-capacitance mode of the display device having a touch sensor according to an example of the present invention in detail, FIG. 6B is a view illustrating the first self-capacitance mode of the display device having a touch sensor according to an example of the present invention in detail, and FIG. 6C is a view illustrating the second self-capacitance mode of the display device having a touch sensor according to an example of the present invention in detail.

Referring to FIG. 6A, in the mutual-capacitance mode, the multiplexer 192 sequentially supplies the first touch-driving signal TDM to the touch-driving lines TX1 to TXn. The sensing unit 194 senses a touch position by sensing variation in mutual capacitance through the touch-sensing lines RY1 to RYm. Here, the multiplexer 194 electrically connects the shield-driving electrodes SX1 to SXn to the touch-driving lines TX1 to TXn and electrically connects the shield-sensing lines SY1 to SYm to the touch-sensing lines RY1 to RYm. Thus, the line resistance of each of the touch-driving lines TX1 to TXn and the touch-sensing lines RY1 to RYm can be reduced.

Referring to FIG. 6B, in the first self-capacitance mode, the multiplexer 192 sequentially supplies the second touch-driving signal TDS to the touch-driving lines TX1 to TXn. The sensing unit 194 senses a touch position by sensing variation in the potential of the touch-driving lines TX1 to TXn in response to the second touch-driving signal.

While the second touch-driving signal TDS is supplied to the touch-driving lines TX1 to TXn, which overlap the shield-driving lines SX1 to SXn, the load free driving signal LFD is supplied to the shield-driving lines SX1 to SXn. Since the load free driving signal LFD has the same amplitude and phase as the first touch-driving signal TDS, there is no difference in voltage between the touch-driving electrode TX and the shield-driving electrode SX in the first self-capacitance mode. Thus, it is possible to minimize the parasitic capacitance between the touch-driving electrode TX1 and the shield-driving electrode SX1, thereby preventing the generation of noise for a first self-capacitance mode period.

The multiplexer 192 supplies a ground voltage GND to the touch-sensing lines RY1 to RYm and the shield-sensing lines SY1 to SYm. The touch-sensing lines RY1 to RYm and the shield-sensing lines SY1 to SYm, to which the ground voltage GND is supplied, block noise generated from the light-emitting element 120 and the pixel-driving circuit, thereby improving touch-sensing performance. In addition, the multiplexer 192 can create a floating state, in which no signal is applied to the touch-sensing lines RY1 to RYm or to the shield-sensing lines SY1 to SYm.

Referring to FIG. 6C, in the second self-capacitance mode, the multiplexer 192 sequentially supplies the second touch-driving signal TDS to the touch-sensing lines RY1 to RYm. The sensing unit 194 senses a touch position by sensing variation in the potential of the touch-sensing lines RY1 to RYm in response to the second touch-driving signal TDS.

While the second touch-driving signal TDS is supplied to the touch-sensing lines RY1 to RYm, which overlap the shield-sensing lines SY1 to SYm, the load free driving signal LFD is supplied to the shield-sensing lines SY1 to SYm. Since the load free driving signal LFD has the same amplitude and phase as the second touch-driving signal TDS, there is no difference in voltage between the touch-sensing electrode RY and the shield-sensing electrode SY in the second self-capacitance mode. Thus, it is possible to minimize the parasitic capacitance between the touch-sensing electrode RY and the shield-sensing electrode SY, thereby preventing the generation of noise for a second self-capacitance mode period.

The multiplexer 192 supplies a ground voltage GND to the touch-driving lines TX1 to TXn and the shield-driving lines SX1 to SXn. The touch-driving lines TX1 to TXn and the shield-driving lines SX1 to SXn, to which the ground voltage GND is supplied, block noise generated from the light-emitting element 120 and the pixel-driving circuit, thereby improving touch-sensing performance. In addition, the multiplexer 192 can create a floating state, in which no signal is applied to the touch-driving lines TX1 to TXn or to the shield-driving lines SX1 to SXn.

Figure 7:
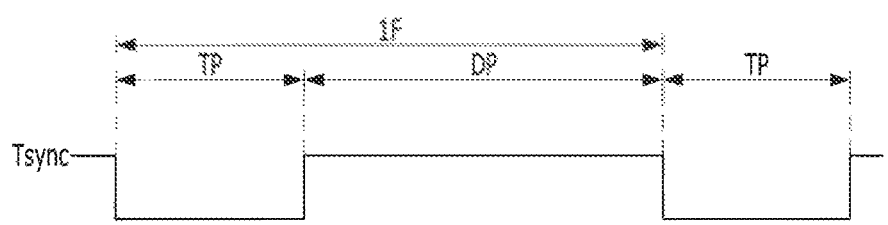
FIG. 7 is a waveform diagram illustrating a control signal for selecting a display mode and a touch-sensing mode of the display device having a touch sensor according to an example of the present invention.

FIG. 7 is a waveform diagram illustrating the signal waveform to be supplied during one frame period in the display device having a touch sensor according to an example of the present invention.

Referring to FIG. 7, one frame period 1F is time-divided into a display period DP and a touch-sensing period TP. One touch-sensing period TP is allocated between the display periods DP.

During the display period DP, a pixel-driving signal (e.g., a scan signal, a data signal, a low-voltage driving signal, and a high-voltage driving signal) is supplied to each subpixel. Here, the scan signal is the voltage of a gate pulse to be supplied to each scan line. The data signal is the data voltage of an input image to be supplied to each data line during the display period. The low-voltage driving signal is the voltage to be supplied to the cathode of each light-emitting element 120 during the display period DP. The high-voltage driving signal is the voltage to be supplied to the drain electrode of each driving transistor during the display period DP. During the display period DP, the touch electrode can be switched to a floating state in which no signal is applied thereto or to a state in which a specific voltage (e.g., ground voltage) is applied thereto.

During the touch-sensing period TP, the touch-driving circuit 190 selectively supplies the touch-driving signals TDM and TDS and the load free driving signal LFD to the touch-sensing lines RY1 to RYm, the touch-driving lines TX1 to TXn, the shield-sensing lines SY1 to SYm and the shield-driving lines SX1 to SXn in response to a touch control signal Tsync received from the timing controller.

Figure 8:
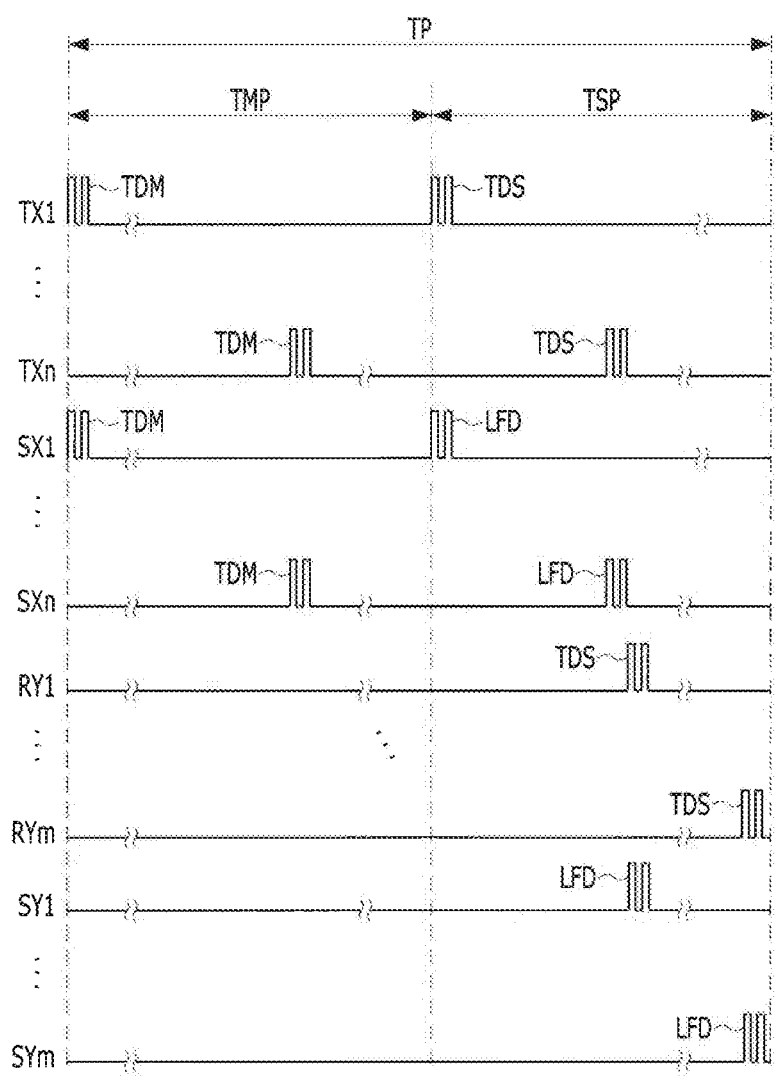
FIG. 8 is a waveform diagram illustrating the signal waveform to be supplied to a touch electrode and a shield electrode in a touch-sensing mode of the display device having a touch sensor according to an example of the present invention.

Specifically, as illustrated in FIG. 8, the touch-sensing period TP is time-divided into a mutual-capacitance mode period TMP and a self-capacitance mode period TSP.

During the mutual-capacitance mode period TMP, the first touch-driving signal TDM is sequentially supplied to the touch-driving electrodes TX1 to TXn. Subsequently, the sensing unit senses a touch position by sensing variation in the potential of the touch-sensing electrodes RY1 to RYm. At this time, the first touch-driving signal TDM is also supplied to the shield-driving electrodes SX1 to SXn, which were electrically connected to the touch-driving electrodes TX1 to TXn.

During the self-capacitance mode period TSP, the second touch-driving signal TDS is sequentially supplied to the touch-driving lines TX1 to TXn, which overlap the shield-driving lines SX1 to SXn. While the second touch-driving signal TDS is supplied to the touch-driving lines TX1 to TXn, the load free driving signal LFD is supplied to the shield-driving lines SX1 to SXn. Subsequently, the second touch-driving signal TDS is sequentially supplied to the touch-sensing lines RY1 to RYm, which overlap the shield-sensing lines SY1 to SYm. While the second touch-driving signal TDS is supplied to the touch-sensing lines RY1 to RYm, the load free driving signal LFD is supplied to the shield-sensing lines SY1 to SYm.

Thus, it is possible to minimize the parasitic capacitance between each of the touch-driving lines TX1 to TXn and the touch-sensing lines RY1 to RYm and the electrodes of the light-emitting element, thereby removing touch noise and consequently increasing touch-sensing accuracy.

Although the light-emitting element 120 and the pixel-driving circuit may not be illustrated in FIGS. 4A to 4D, a plurality of light-emitting elements 120 and pixel-driving circuits can be disposed under the encapsulation unit 140, as illustrated in FIG. 2.

As is apparent from the above description, according to the present invention, a shield electrode is disposed between each of a touch-sensing line and a touch-driving line and a light-emitting element. While a touch-driving signal of a self-capacitance mode is applied to at least one of the touch-sensing line or the touch-driving line, a load free driving signal, of which at least one of the phase or the amplitude is the same as that of the touch-driving signal, is supplied to the shield line. As a result, it is possible to remove touch noise and consequently to secure improved touch-sensing performance.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:
1. A display device comprising:
a light-emitting element disposed on a substrate;

an encapsulation unit disposed to cover the light-emitting element;
a shield line disposed on the encapsulation unit and comprising a shield-driving line disposed along a touch-driving line and a shield-sensing line disposed along a touch-sensing line;
the touch-driving line and the touch-sensing line overlapping the shield line, the touch-driving line overlapping the shield-driving line, and the touch-sensing line overlapping the shield-sensing line;
a touch insulation film between the shield line and the touch-driving and touch-sensing lines;
a touch-driving circuit configured to drive the touch-driving line and the touch-sensing line in a mutual-capacitance mode and to drive at least one of the touch-driving line or the touch-sensing line in a self-capacitance mode;
a plurality of shield-routing lines extended along a lateral surface of the encapsulation unit and disposed on the lateral surface of the encapsulation unit, each shield-routing line of the plurality of shield-routing lines being connected to a corresponding one of the shield-sensing line and the shield-driving line on the encapsulation unit; and
a plurality of touch-routing lines extended along the lateral surface of the encapsulation unit and disposed on the lateral surface of the encapsulation unit, each touch-routing line of the plurality of touch-routing lines being connected to a corresponding one of the touch-sensing line and the touch-driving line,
wherein the touch-driving circuit supplies a load free driving signal to the shield line, at least one of a phase or an amplitude of the load free driving signal being same as a phase or an amplitude of a touch-driving signal of the self-capacitance mode to be supplied to at least one of the touch-driving line or the touch-sensing line,
wherein the shield-driving line comprises a plurality of shield-driving electrodes disposed on the encapsulation unit in a first direction, and a first shield bridge connecting the shield-driving electrodes to each other,
wherein the shield-sensing line comprises a plurality of shield-sensing electrodes disposed in a same plane as the shield-driving electrodes in a second direction, and a second shield bridge connecting the shield-sensing electrodes to each other, and
wherein the second shield bridge includes lower and upper touch bridges which are disposed in different planes from each other.

2. The display device according to claim 1, wherein, in the mutual-capacitance mode, the touch-driving circuit senses a variation in mutual capacitance through the touch-sensing line by supplying a first touch-driving signal to the touch-driving line, and electrically connects the shield-driving line to the touch-driving line or floats the shield-driving line.

3. The display device according to claim 2, wherein, in the self-capacitance mode, the touch-driving circuit senses a variation in self-capacitance of at least one of the touch-driving line or the touch-sensing line by supplying a second touch-driving signal to at least one of the touch-driving line or the touch-sensing line, and supplies the load free driving signal to at least one of the shield-driving line or the shield-sensing line.

4. The display device according to claim 1, wherein the self-capacitance mode and the mutual-capacitance mode are alternately driven,
wherein the self-capacitance mode comprises a first self-capacitance mode and a second self-capacitance mode, the first self-capacitance mode and the second self-capacitance mode being driven in that order or in a reverse order.

5. The display device according to claim 4, wherein, in the first self-capacitance mode, the touch-driving circuit supplies a second touch-driving signal to the touch-driving line and supplies the load free driving signal to the shield-driving line, and
wherein, in the second self-capacitance mode, the touch-driving circuit supplies the second touch-driving signal to the touch-sensing line and supplies the load free driving signal to the shield-sensing line.

6. The display device according to claim 5, wherein, in the first self-capacitance mode, the touch-driving circuit supplies a ground voltage to the touch-sensing line and the shield-sensing line, and
wherein, in the second self-capacitance mode, the touch-driving circuit supplies a ground voltage to the touch-driving line and the shield-driving line.

7. The display device according to claim 1, wherein the touch-driving line comprises a plurality of touch-driving electrodes disposed on a touch insulation film in the first direction, and a first touch bridge connecting the touch-driving electrodes to each other, the touch insulation film being disposed on the shield-driving electrodes, and
wherein the touch-sensing line comprises a plurality of touch-sensing electrodes disposed in a same plane as the touch-driving electrodes in the second direction, and a second touch bridge connecting the touch-sensing electrodes to each other.

8. The display device according to claim 7, wherein the first touch bridge is disposed on a same plane as the shield-driving electrodes.

9. The display device according to claim 7, wherein the second touch bridge includes lower and upper touch bridges which are disposed in different planes from each other.

10. The display device according to claim 1, further comprising: a shield pad connected to the shield-routing line, the shield pad being disposed on the substrate exposed by the encapsulation unit; and a touch pad connected to the touch-routing line, the touch pad being disposed adjacent to the shield pad.

11. The display device according to claim 10, wherein the substrate is foldable or bendable.

\* \* \* \* \*